United States Patent
Bacquet et al.

(10) Patent No.: US 9,420,491 B2
(45) Date of Patent: Aug. 16, 2016

(54) METHOD OF DYNAMIC ALLOCATION OF SHARED RESOURCES IN A TIME-FREQUENCY PLAN AND ASSOCIATED DEVICE

(71) Applicants: THALES, Neuilly-sur-Seine (FR); CENTRE NATIONAL D'ETUDES SPATIALES, Paris (FR)

(72) Inventors: Pierre Bacquet, Toulouse (FR); Charles Daymand, Toulouse (FR); Mathieu Arnaud, Toulouse (FR)

(73) Assignees: Thales, Courbevoie (FR); Centre National D'Etudes Spatiales, Paris (FR)

(*) Notice: Subject to any disclaimer, the term of this patent is extended or adjusted under 35 U.S.C. 154(b) by 219 days.

(21) Appl. No.: 14/061,618

(22) Filed: Oct. 23, 2013

(65) Prior Publication Data
US 2014/0112302 A1    Apr. 24, 2014

(30) Foreign Application Priority Data
Oct. 24, 2012    (FR) .................................. 12 02833

(51) Int. Cl.
| | |
|---|---|
| H04W 28/04 | (2009.01) |
| H04W 72/04 | (2009.01) |
| H04B 7/185 | (2006.01) |
| H04B 7/204 | (2006.01) |
| H04B 7/26 | (2006.01) |

(52) U.S. Cl.
CPC ........ *H04W 28/044* (2013.01); *H04B 7/18523* (2013.01); *H04B 7/2043* (2013.01); *H04B 7/2656* (2013.01); *H04W 72/0406* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 6,539,003 B1 | 3/2003 | Agarwal et al. | |
| 2008/0069045 A1* | 3/2008 | Delamotte et al. | 370/330 |
| 2008/0219236 A1* | 9/2008 | Love et al. | 370/347 |
| 2009/0028102 A1* | 1/2009 | Kakura | 370/329 |
| 2010/0034136 A1* | 2/2010 | Brener et al. | 370/321 |
| 2010/0238856 A1* | 9/2010 | Argov | H04B 7/1858 370/317 |
| 2011/0235602 A1* | 9/2011 | Ji et al. | 370/329 |

FOREIGN PATENT DOCUMENTS

FR    2874147 A1    2/2006

OTHER PUBLICATIONS

DVB-RCS2 Fact Sheet—Return Channel Satellite—Aug. 2012, DVB Project Office.*
Ki-Dong Lee, et al., "Optimal Scheduling for Timeslot Assignment in MF-TDMA Broadband Satellite Communications", Proceedings of IEEE 56th Vehicular Technology Conference, Sep. 24-28, 2002, pp. 1560-1564, vol. 3, IEEE, New York, NY, US, XP010608691.
"Digital Video Broadcasting (DVB); Interaction Channel for Satellite Distribution Systems; ETSI EN 301 790", IEEE, Lis, Sophia Antipolis Cedex, FR, vol. BC, No. V1.3.1, Mar. 1, 2003, XP014003845.
Digital video Broadcasting (DVB); Second Generation DVB Interactive Satellite System (DVB-RCS2); Part 2: Lower Layers for Satellite Standard, European Standard, ETSI EN 301 545-2, Jan. 2012, vol. V1.1.1, Sophia Antipolis, FR.

* cited by examiner

*Primary Examiner* — Derrick Ferris
*Assistant Examiner* — Jay Vogel
(74) *Attorney, Agent, or Firm* — Baker & Hostetler LLP (57) ABSTRACT

A method is provided of dynamic allocation of shared resources in a communication network, consisting in defining, in a time-frequency plan, a superframe of a given duration $\Delta T$ and a given spectral width $\Delta f$, made up of one or more frames, each defining a regular time-frequency grid, of which one square, referred to as a time-frequency unit, constitutes the smallest time and frequency interval allocable to a user of said network within said frame, said method consisting in reserving, on each carrier frequency of a frame, at least one block of a number K, greater than or equal to 1, of time-frequency units which can be dynamically allocated to a user for communication or for synchronization.

15 Claims, 7 Drawing Sheets

FIG.11

METHOD OF DYNAMIC ALLOCATION OF SHARED RESOURCES IN A TIME-FREQUENCY PLAN AND ASSOCIATED DEVICE

CROSS-REFERENCE TO RELATED APPLICATION

This application claims priority to foreign French patent application No. FR 1202833, filed on Oct. 24, 2012, the disclosure of which is incorporated by reference in its entirety.

FIELD OF THE INVENTION

The invention relates to the field of communication networks with allocation of shared communication resources, such as, for example, satellite communication networks.

The subject-matter of the invention is notably a method for the dynamic allocation of shared resources among a plurality of users of the same network or communication system. In the context of the present invention, the expression "shared resources" designates communication resources allocated to a user in the form of time intervals and frequency bands centred on a given carrier frequency. A particular arrangement of all time intervals and associated carriers is called the time/frequency plan. The allocation of resources by time/frequency plan is a technique known to the person skilled in the art by the acronym MF-TDMA (Multi Frequency Time Division Multiple Access).

One objective of a method of allocation of shared resources is to provide an optimum sharing of the communication resources to all of the users of the network in such a way as to avoid collisions when two or more users attempt to communicate on the same time and frequency intervals.

BACKGROUND

The invention is described below in the context of a particular example of a satellite communication network for which a plurality of users communicate with a satellite communication management station via a return channel. A satellite network of this type may, for example, implement the DVB-S (Digital Video Broadcasting Satellite) standard or developments thereof on the direct broadcasting channel between the management station and the users and the DVB-RCS (Digital Video Broadcasting-Return Channel Satellite) standard or developments thereof on the return channel between the users and the communication management station.

The invention is described below in the particular context of the second-generation development of the DVB-RCS standard, commonly referred to by the acronym DVB-RCS2 and described notably in the document entitled "Digital Video Broadcasting (DVB): Second generation DVB interactive satellite system; part 2: lower layers for satellite standard, DVB document ETSI EN 301 545-2 v1.1.1 (2012-01)". The invention may also be applied in an equivalent manner to any other communication network in which a problem of sharing resources among users arises in a similar manner.

In a communication network implementing the DVB-RCS standard, access to the communication on the return channel is provided by means of the time/frequency plan of the MF-TDMA (Multi Frequency-Time Division Multiple Access) type defined in advance by the operator and notified to users.

According to this standard, the return channel is subdivided into superframes, which are themselves divided into frames, which are themselves divided into time and frequency intervals. A superframe defines the chosen time/frequency plan, corresponding to a chosen portion of times and frequencies. Within a superframe, the frames and time intervals are classified from the start of the first time interval and the lowest frequency until the end of the last time interval and the highest frequency. Each frame of a superframe defines a portion of the usable time/frequency plan.

Access to the resources is provided by allocating to each user one or more time intervals and one or more carriers within a frame by means of dedicated signalling messages transmitted by the communication management station.

An important aspect for guaranteeing the correct operation of shared access to resources defined by the time/frequency plan relates to the time and frequency synchronization between each user and the communication management station. Users must in fact synchronize their internal clocks with the clock of said station in such a way that they actually communicate in the time and frequency intervals which are allocated to them without interfering with the neighbouring intervals which may be allocated to other users.

To guarantee the synchronization of all users, one solution, compatible with the DVB-RCS standard, is to provide a time/frequency plan arrangement which consists in inserting one or more synchronization intervals at the end of each carrier of a frame. Each terminal transmits a synchronization message in a dedicated interval in order to indicate its presence to the communication management station which recovers this message, performs the synchronization measures and re-transmits information to the user enabling him to perform resynchronization.

The intervals of a frame allocated to synchronization are not usable to communicate and therefore the allocatable communication resources are reduced. The use of one or more reserved synchronization interval(s) per carrier enables correct operation of the network even when it is operating at maximum load. However, this approach results in an over-reservation of resources dedicated to synchronization to the detriment of the resources dedicated to communication when the system is not operating at maximum load.

This problem has all the more impact when the number of carriers per frame is increased, for example due to a degradation of the link budget resulting in a reduction in the bandwidth of a carrier. In such a case, the available resources become scarcer since certain carriers may have a significantly degraded link budget, and therefore a requirement exists to increase the resources dedicated to communication.

More generally, a problem targeted by the present invention relates to the adaptation to the load variations of the network of available resources, between those dedicated to communication and those dedicated to synchronization.

The French patent application published under number FR2874147 is known, which describes a device for the allocation of shared resources of a communication network through allocation of time intervals in a dynamically adaptable time/frequency plan. This application describes the principle of dynamic allocation of carriers by varying the bandwidth of the carriers of a frame as a function notably of the link budget.

However, the problems of optimum sharing of available resources between those dedicated to communication and those dedicated to synchronization are not mentioned.

SUMMARY OF THE INVENTION

The invention proposes a method for the allocation of shared resources which enables the dynamic allocation of time and frequency resources either for synchronization purposes or for communication purposes, as a function of the network load.

The invention optimizes the distribution of resources between those dedicated to synchronization of the receivers and those dedicated to communication.

The invention is advantageously applied in the context of the allocation of shared resources on the return channel of a two-way satellite communication system. In particular, the invention is applied to a system compatible with the DVB-RCS2 standard or developments thereof.

The subject-matter of the invention is notably a method of dynamic allocation of shared resources in a communication network, consisting in defining, in a time-frequency plan, a superframe of a given duration $\Delta T$ and a given spectral width $\Delta f$, consisting of at least one frame, defining a regular time-frequency grid, of which one square, referred to as a time-frequency unit, constitutes the smallest time and frequency interval allocatable to a user of said network within said frame, said method consisting in reserving, on each carrier frequency of a frame, at least one block of a number K, greater than or equal to 1, of time-frequency units which can be dynamically allocated to a user for communication or for synchronization.

According to one particular aspect of the invention, the number of time-frequency units per frame allocated for synchronization is at least equal to the minimum number $N_u$ of time-frequency units per frame required to provide the synchronization of all connected users, this minimum number $N_u$ being equal to the rounded value of the ratio of the duration of a superframe to the synchronization period of the user, multiplied by the number of users connected to the network.

According to one particular aspect of the invention, a number $N_B$ of blocks of K time-frequency units is reserved in a frame for the synchronization of users, this number $N_B$ being equal to the whole part in excess of the ratio between said minimum number $N_u$ of time-frequency units per frame required to provide the synchronization of all connected users and the number K of time-frequency units per block, the other blocks of K time-frequency units being reserved for the communication of users.

According to one particular aspect of the invention, the blocks of K time-frequency units reserved for the synchronization of users are distributed in a regular manner among all of the carrier frequencies of a frame.

According to one particular aspect of the invention, in the blocks of K time-frequency units reserved for the synchronization of users, a number $N_u$ of time-frequency units is allocated to synchronization via access reserved for a user, said number $N_u$ being equal to the minimum number of time-frequency units per frame necessary to provide the synchronization of all connected users, the remaining time-frequency units within said blocks being allocated to the synchronization of users via random access or to the communication of users.

According to one particular aspect of the invention, said blocks reserved for the synchronization of users are positioned at the carrier end.

According to one particular aspect of the invention, a block of K time-frequency units reserved for the communication of users is combined to form a communication unit.

According to one particular aspect of the invention, in order to allocate to a user a time-frequency unit reserved for synchronization within a block of a carrier frequency:
the ratio between the frequency variation between the carrier frequency of said block and the last carrier frequency on which the user has communicated and the time interval between the last time-frequency unit used by the user for communication and the time-frequency unit reserved for synchronization to be allocated is calculated for each user connected to said network,
said time-frequency unit reserved for synchronization is allocated to the user for whom said ratio is the lowest.

In one alternative embodiment of the invention, a superframe is made up of the concatenation of at least one first frame composed entirely of time-frequency units allocated to the communication of users, and a second frame composed of said blocks of K time-frequency units reserved on each carrier frequency in order to be dynamically allocated to a user for communication or for synchronization.

According to one particular aspect of the invention, the configuration of the allocation of the time-frequency units of each frame of a superframe to communication or to synchronization is transmitted to the users periodically, with a period equal to the duration of a superframe.

According to one particular aspect of the invention, the number K of time-frequency units per block is equal to 6 and can be broken down into 6 units allocated to the synchronization of users or 3 units allocated to the synchronization of users and 3 units, combined, allocated to the communication of users or to 6 units, combined, allocated to the communication of users.

According to one particular aspect of the invention, said method is compatible with the DVB-RCS2 standard.

The subject-matter of the invention is also a device for the dynamic allocation of shared resources for the communication and synchronization of a plurality of user terminals in a communication network, characterized in that it comprises means suitable for carrying out the dynamic allocation method according to the invention.

According to one particular aspect of the invention, said allocated resources are those of the return channel between said user terminals and said device.

The subject-matter of the invention is also a satellite communication management device comprising means to communicate with a plurality of user terminals via a satellite link according to a direct channel and a return channel, and a device for the dynamic allocation of shared resources on the return channel according to the invention.

BRIEF DESCRIPTION OF THE DRAWINGS

Other characteristics and advantages of the present invention will be more evident from a reading of the description which follows, in relation to the attached drawings, in which.

DETAILED DESCRIPTION

The invention is presently described in the context of a system for satellite communication between a satellite station and a plurality of receivers and more precisely for the allocation of shared resources on the return channel between the receivers and the satellite station.

The invention is described for an embodiment corresponding to an implementation compatible with the DVB-RCS2 standard, but is not limited to this standard alone. On reading the description which follows, the person skilled in the art will be able to carry out the method according to the invention for any other terrestrial or satellite communication system with shared resources, for which the allocation of resources is carried out according to a time-frequency plan.

Figure 1:
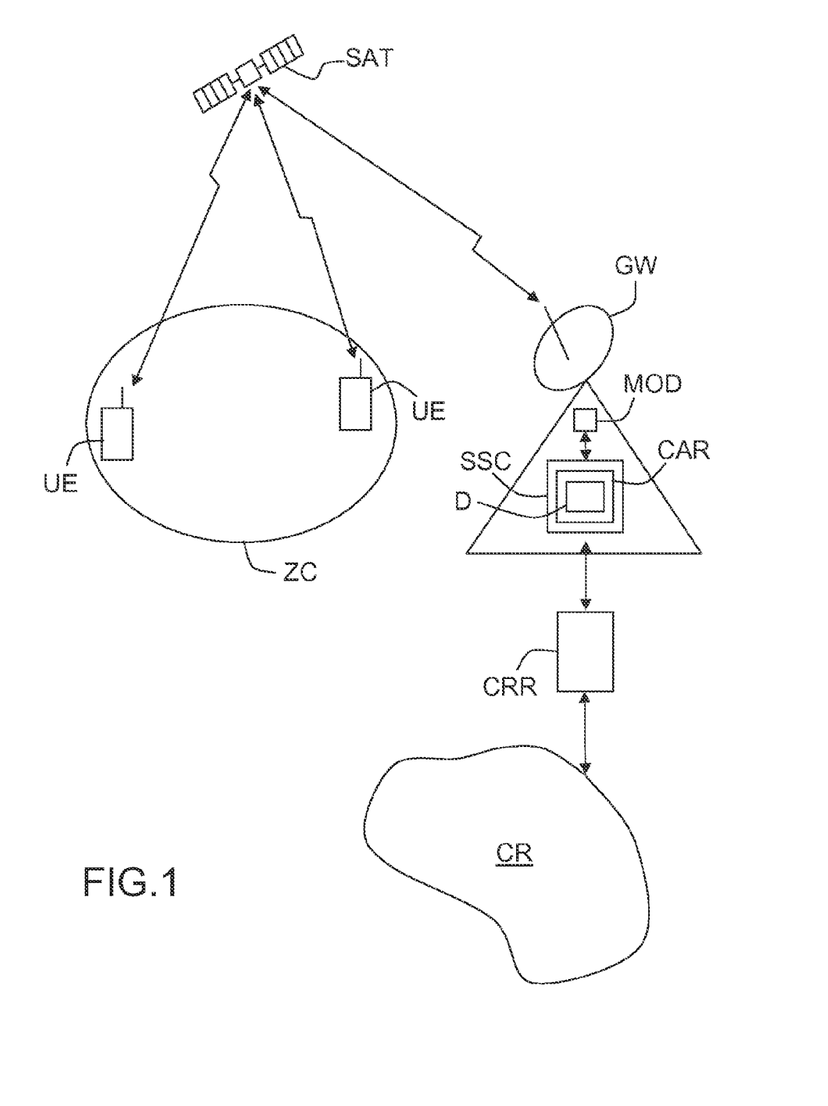
FIG. 1 shows an example of a satellite communication system comprising a device for the allocation of shared resources according to the invention.

FIG. 1 is a diagram showing a satellite communication system which comprises at least one communication management device, shown in FIG. 1 in the form of a satellite station GW ("Gateway"), connected to the network core CR by a radio network controller CRR, and at least one telecommunications satellite SAT acting as a relay or transponder between the satellite station GW and the user terminals UE equipped with a satellite transceiver.

A user terminal UE may be any network device capable of exchange and communication via a wireless link, either with another device or with its own home network. It may, in particular, be a fixed or portable computer, a fixed or portable telephone, a personal digital assistant, a server or a satellite Internet access modem.

The satellite station GW is notably responsible for processing the received signal and for managing requests from the different users UE to access the satellite network. The satellite SAT is furthermore associated with one or more radio cells which are located in each of its coverage zones ZC. In the example shown in FIG. 1, the satellite SAT covers one cell only, corresponding to a single beam.

The satellite station GW comprises notably a return link subsystem SSC, comprising a resource allocation controller CAR responsible, notably, for controlling a modem MOD. Moreover, the return link subsystem SSC provides the functions of control and monitoring of the return channel, i.e. from the user terminals UE to the satellite station GW, and generates the signalling necessary for the operation of this return channel. The resource allocation controller CAR furthermore performs the functions of controlling access to the shared resources of the return channel.

The satellite station GW furthermore comprises a device D for the allocation of shared resources according to the invention which is responsible for managing in an effective and adaptive manner the resources of the network on the return channel and in particular their sharing between resources dedicated to communication and resources dedicated to synchronization.

As shown in FIG. 1, the device D according to the invention is preferably installed in the resource allocation controller CAR, but it could also form part of the return link subsystem SSC and be coupled to the resource allocation controller CAR, or it could be outside the return link subsystem SSC while being coupled to the latter.

The device D comprises means suitable for carrying out the method of shared allocation of resources according to the invention which is presently described.

Figure 2:
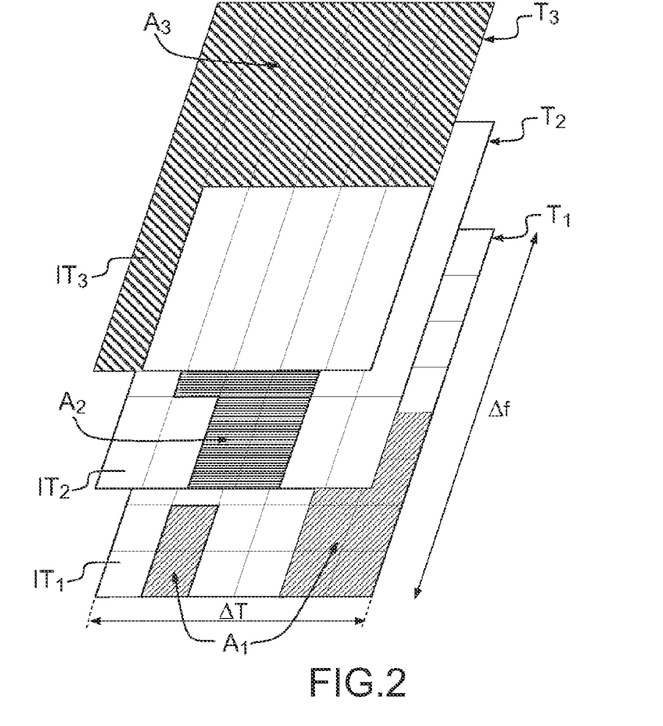
FIG. 2 shows an example of an arrangement of a time-frequency plan in a plurality of frames and the allocation of time-frequency units inside these frames.

FIG. 2 shows, in a time-frequency diagram, an example of a particular arrangement of a plurality of frames T1, T2, T3 defined by the device D to develop the shared resource allocation strategy.

Each frame T1, T2, T3 is defined here by a continuous zone of the time-frequency plan which covers the entire frequency band $\Delta f$ allocatable to users for communication and which has a fixed duration $\Delta T$. Each frame T1, T2, T3 is also defined by a time-frequency grid divided into time-frequency units IT1, IT2, IT3 which correspond to the smallest resource allocatable to a user. In general, the duration in time of a time-frequency unit is also fixed, whereas the frequency band covered by a time-frequency unit may vary according to the definition of the time-frequency grid of each frame as shown in FIG. 2. In fact, the frequency band $\Delta f$ covered by a frame can be broken down into variable-width carriers. In the example shown in FIG. 2, the frame T1 comprises twice as many carriers as the frame T2, which itself comprises twice as many carriers as the frame T3. In this way, it is possible to adapt the frequency resources allocatable to a user according to his requirements in terms of symbol rate capacity, but also to take account of interference phenomena, such as rain events, which may result in preference being given, for a given user, to a carrier which is more robust in terms of link budget, but which has a lower available rate.

Within each time-frequency plan, the resource allocation device D defines one or more frames T1, T2, T3 which are made up of one or more time-frequency units IT1, IT2, IT3. The resource allocation method then consists in allocating one or more time-frequency units of a frame to each user for his communication and/or synchronization requirements. In FIG. 2, the allocations of resources A1, A2 and A3 in each of the frames T1, T2 and T3 are shown by shaded areas.

Figure 3:
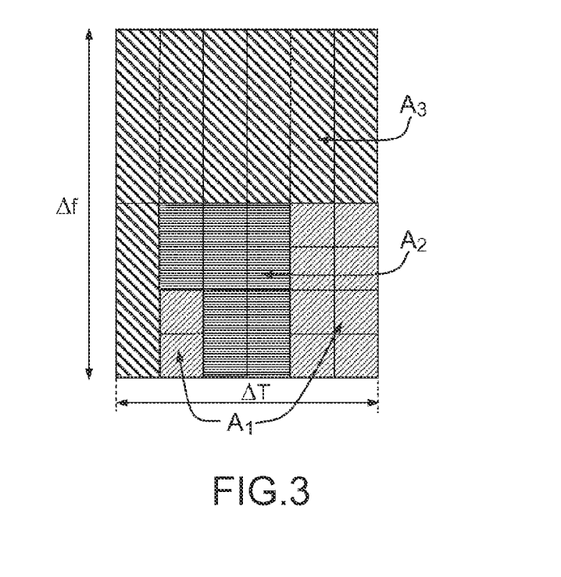
FIG. 3 illustrates the actual time-frequency grid during a given period $\Delta T$ according to the allocation indicated in FIG. 2.

FIG. 3 shows the breakdown of the time-frequency plan according to the allocations of resources A1, A2, A3 defined on the basis of the three available types of frame T1, T2, T3.

Without exceeding the scope of the invention, other types of frames can be defined, notably frames of which the duration is less than the maximum duration $\Delta T$ of the zone of the allocatable time-frequency plan or of which the bandwidth is also less than the maximum allocatable bandwidth $\Delta f$.

The resource allocation pattern shown in FIG. 3 covers a zone of duration $\Delta T$ and bandwidth $\Delta f$ of the time-frequency plan. The resource allocation is reiterated with each new temporal occurrence of a zone of the same dimensions ($\Delta T$, $\Delta f$) in the time-frequency plan. In other words, the duration $\Delta T$ corresponds to the period at which the allocation of shared resources is renewed.

The set made up of the frames T1, T2, T3 is referred to as the superframe. A superframe contains all of the possible frames. Its duration is equal to the allocation period $\Delta T$. The definition of a superframe, in particular its duration $\Delta T$ and its frequency bandwidth $\Delta f$, and also the definition of the frames T1, T2, T3 which make it up are communicated to the users by the satellite station GW via the direct broadcasting channel by means of signalling data, for example in the form of tables. In general, these definitions do not change, or change and are retransmitted at a slow rate. Conversely, the allocation to a user of a time-frequency unit within a given frame is carried out frequently, at the end of each occurrence of an allocation of the time-frequency plan over the allocation duration $\Delta T$ and also by means of signalling data, for example in tabular form.

By way of example, the DVB-RCS2 standard defines three types of signalling tables. The Superframe Composition Table SCT2 defines the overall coverage of the time-frequency plan. The Frame Composition Table FCT2 defines the structure of the frames within a superframe. These two tables SCT2, FCT2 are transmitted infrequently to users since the organization of the time-frequency plan is generally fixed once and its change entails modifications of the modulators and demodulators of the communication system. The table for the allocation of time-frequency units to users referred to as TBTP2 ("Terminal Burst Time Plan") defines precisely the distribution of the units of the different frames for communication and simultaneous synchronization of the network users. This table is transmitted with each new allocation.

Figure 4:
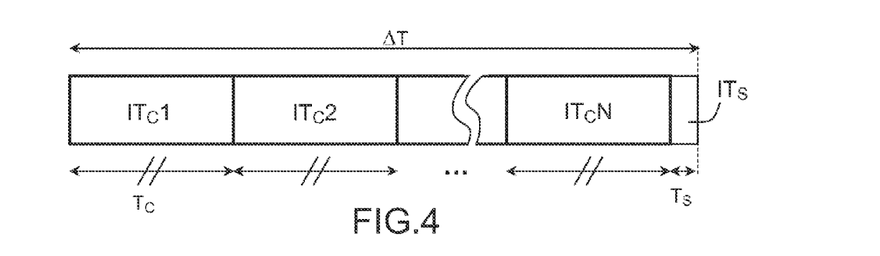
FIG. 4 shows an example of static allocation of synchronization time intervals.

FIG. 4 sets out the distribution, for a given carrier of the frame, between the resources allocated to users for communication and those allocated for synchronization according to a static allocation method. An allocation of this type consists in assigning a time-frequency unit ITS at the end of each carrier of a frame to the synchronization between a user terminal UE and the satellite station GW. All the other time-frequency units ITC1, ITC2, . . . , ITCN are reserved for communication. A unit allocated to communication is in principle made up of the combination of a plurality of time-frequency units, for example 6 units in the case shown in FIG. 5, since the communication between a user terminal and the satellite station requires time units with a duration greater than those necessary for synchronization. A static allocation method of this type does not take account of the number of users connected to the network at a given time and its variation with time, and therefore causes an over-reservation of the synchronization resources which is higher when the number of carriers in a frame is large.

Figure 5:
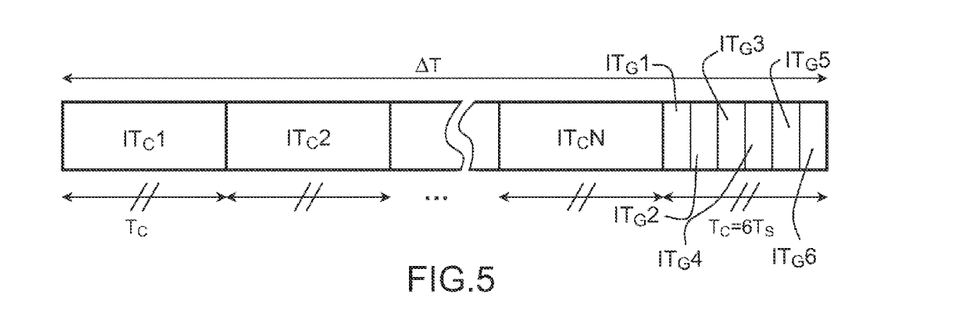
FIG. 5 shows an illustration of the principle of allocation of generic time intervals for a given carrier according to the invention, a generic time interval being able to be assigned to a communication or synchronization interval.

FIG. 5 sets out the principle on which the method for dynamic allocation of shared resources according to the invention is based. Each carrier of each frame is broken down into a number N+1 of time intervals of the same duration $T_C$, each time interval is composed of a plurality of time-frequency units, 6 in the example shown in FIG. 5. The number of time-frequency units making up a time interval is configured according to the communication requirements of the users and more directly according to the minimum duration of a communication interval. The N first intervals $ITC_1$, $ITC_2$, . . . , $ITC_N$ made up in this way are reserved for the allocation to communication requirements, just as in the static allocation solution presented in FIG. 4. The last time interval is made up of 6 generic time-frequency units $ITG_1$, $ITG_2$, $ITG_3$, $ITG_4$, $ITG_5$, $ITG_6$, i.e. units which can be allocated to either communication or synchronization requirements. The dynamic allocation method according to the invention then consists, for each carrier of each frame, in defining the generic units which must be reserved for communication or synchronization requirements, then in establishing a strategy for the allocation of the communication and synchronization units to the connected users according to the overall requirements of the network and allocations already established for the N first intervals of a carrier.

Figure 6:
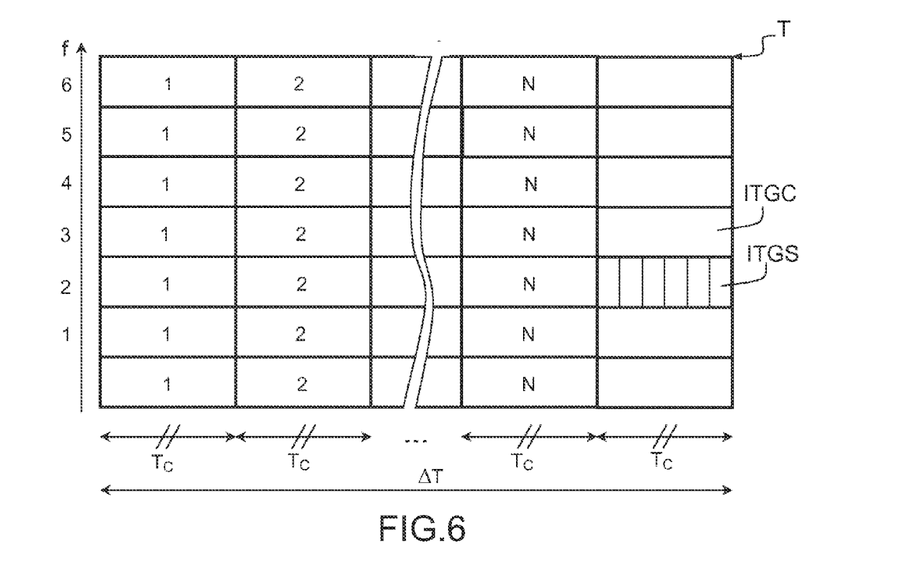
FIG. 6 shows an illustration of the principle of allocation of generic time intervals for a frame according to the invention.

FIG. 6 illustrates the dynamic allocation principle for a frame T comprising 7 frequency carriers indexed from 0 to 6. The last time intervals with a total duration $T_C$ equal to that of an interval allocated to communication requirements are reserved as generic time-frequency units. These generic units can either be allocated entirely to synchronization requirements or combined to form a communication interval, or partially allocated to synchronization requirements and to communication requirements.

In the example shown in FIG. 6, the 6 generic units of the carrier number 2 are all allocated to synchronization units ITGS. The generic units of the other carriers are all combined to form communication intervals ITGC. A case not shown in FIG. 6 would consist in assigning, on the same carrier, 3 generic units to synchronization units, and in combining the 3 other generic units to form a short communication interval, the duration of which is equal to half of the duration $T_C$ of the other communication intervals. This last case is conceivable only if the standard implemented by the communication system allows the configuration of communication intervals with two types of different durations.

The use of generic time-frequency units allows the resources allocated to synchronization to be adapted to the requirements of the network and therefore certain time-frequency units normally allocated to synchronization to be reassigned to communication requirements.

Figure 7:
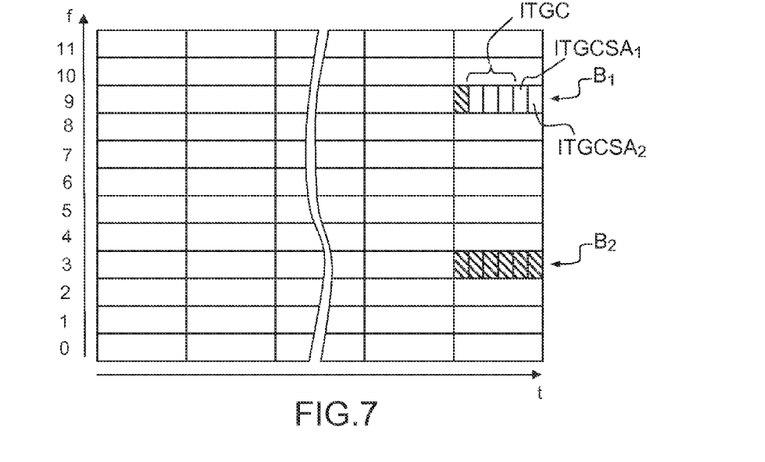
FIG. 7 shows a particular example of dynamic allocation of generic time intervals according to the number of users connected to the network.

FIG. 7 shows, in an example, the first step of the resource allocation method according to the invention consisting in assigning the generic time-frequency units of each carrier of a frame either to synchronization units or to communication intervals.

The choice of the number of synchronization units to be allocated is made according to the number of connected user terminals. In practice, a synchronization unit must be allocated to each user periodically in such a way as to avoid clock drifts between the terminals and the satellite station which may cause desynchronizations. The synchronization period of the terminals, i.e. the period between two transmissions of a synchronization message, is predetermined, for example it is taken as equal to 1 second.

According to the synchronization period, the number of connected user terminals at a given time and the characteristics of the frame, notably its duration, the resource allocation device according to the invention determines the minimum number of synchronization units to be assigned in a frame. This number $N_U$ can be calculated as the rounded value of the number $(\Delta T/P).M$, where $\Delta T$ is the duration of a superframe, P is the synchronization period and M is the number of connected users. Rounded value is understood to mean the whole part or the whole part in excess, according to the required rounding.

Once the number $N_U$ of synchronization units per frame has been determined, the number $N_B$ of blocks reserved for synchronization which is equal to the whole part in excess of the ratio $N_U/K$ is determined, where K is the number of generic units available in a block at the end of each carrier. The expression "whole part in excess" means the smallest number of blocks $N_B$ such that the product of this number $N_B$ by the number K of generic units in a block is greater than or equal to Nu. The blocks of generic units are then distributed in a homogeneous manner among the carriers of the frame. The generic units of the remaining frames are combined to form a communication interval.

FIG. 7 shows the method used in a non-limiting example where the number of connected users is equal to M=7 and the duration of a frame is equal to the synchronization period. The number K of generic units per carrier is equal to 6, and it is therefore necessary to reserve 2 blocks of 6 generic units for the synchronization in a frame. These 2 blocks B1, B2 are distributed in a regular manner in terms of frequency over the carriers with the objective of limiting the frequency hops to be carried out by a user terminal to pass from one carrier on which it communicates to a different carrier on which it is authorised to synchronize itself. Regular distribution is understood to mean that the frequency spacing between two adjacent blocks is more or less constant for all blocks. In the example shown in FIG. 7, the two blocks B1, B2 are assigned to the carriers with indices 3 and 9 out of the 12 carriers in total which the frame comprises, but they could also be assigned to the carriers with indices 4 and 8.

Among the blocks B1, B2 of 6 reserved generic units, a number $N_U$ of units is assigned to synchronization resources. The remaining units within the blocks B1, B2 of reserved generic units which have not been assigned to synchronization requirements can be reassigned to communication requirements if the number of remaining units is sufficient to combine them in order to form a communication interval. If their number is not sufficient, it is also possible to assign the remaining units to random synchronization resources, i.e. resources which are not reserved for a user terminal in particular, but are accessible to all terminals. The provision of random synchronization units can be useful notably when the variations in network load are faster than the rate at which the dynamic allocation of shared resources is updated according to the number of connected users.

In the example shown in FIG. 7, the necessary number of synchronization units is equal to 7, which means that 12−7=5 generic units remain unused. According to the constraints of the system over the duration of an allocatable communication interval, the 5 generic units can be totally or partially reassigned to communication resources, or can be assigned to random access synchronization resources. In practice, the constraints of the system most often dictate that a communication interval must have a fixed duration. In the example shown in FIG. 7, which corresponds to the case of use of the DVB-RCS2 standard, a communication interval must have a duration of 6 or 3 time-frequency units. In this case, the 5 remaining generic units can be separated into 2 random access synchronization units ITGSA1, ITGSA2 and 3 units combined to form a communication interval ITGC allocatable to a user.

Figure 8:
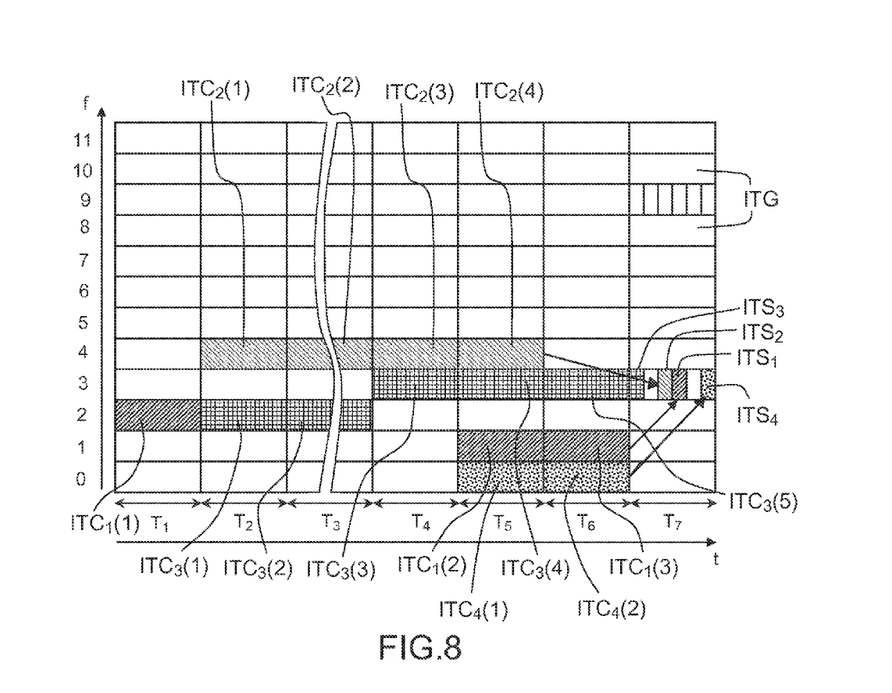
FIG. 8 shows an illustration, for the example shown in FIG. 6, of the strategy for allocating the defined generic time intervals to the users of the network.

FIG. 8 shows the carrying out of the second step of the method of allocating shared resources according to the invention which consists in sharing the communication and synchronization resources created from the generic time-frequency units among the different users of the network.

The synchronization time-frequency units are allocated to a user terminal according to the frequency gradient between the last frequency used by this terminal to communicate and the frequency occupied by the synchronization unit.

FIG. 8 shows, in a non-limiting example, the process of allocating synchronization units of the carrier with the index 3 to 4 user terminals simultaneously connected to the network.

The communication units of the frame have been allocated in advance to the different users in the following manner. The first user has been allocated the unit $ITC_1(1)$ corresponding to the first time interval $T_1$ of the frame and to the carrier with the index 2, then the unit $ITC_1(2)$ corresponding to the fifth time interval $T_5$ of the frame and to the carrier with the index 1, then the unit $ITC_1(3)$ corresponding to the sixth time interval $T_6$ of the frame and to the carrier with the index 1. The second user has been allocated the time-frequency units $ITC_2(1)$, $ITC_2(2)$, $ITC_2(3)$, $ITC_2(4)$, all located on the carrier with the index 4. The third user has been allocated the time-frequency units $ITC_3(1)$, $ITC_3(2)$ located on the carrier with the index 2 and the time-frequency units $ITC_3(3)$, $ITC_3(4)$, $ITC_3(5)$ located on the carrier with the index 3. Finally, the last user has been allocated the time-frequency units $ITC_4(1)$, $ITC_4(2)$ located on the carrier with the index 0.

The allocation of the communication time-frequency units T1 to T6 of the frame does not form part of the invention and is carried out by any shared resource allocation method among those known to the person skilled in the art.

The synchronization units located on the carrier with the index 3 are allocated to the users according to the carrier belonging to the last communication time-frequency unit allocated to a user. The criterion consists in allocating the first synchronization units to the users who communicated on the same carrier or on an adjacent carrier during the last access to the resources within the frame. Conversely, the users who communicated on a carrier distant from the synchronization carrier are allocated the last synchronization units of the last block of units.

In the example shown in FIG. 8, the last communication of the first user is carried out on the carrier with the index 1, that of the second user is carried out on the carrier with the index 4, that of the third user is carried out on the carrier with the index 3 and that of the fourth user is carried out on the carrier with the index 0. Consequently, the third user will not need to change carriers between the interval T6 and the interval T7 and can therefore synchronize itself with the first unit $ITS_3$ more easily than the other users who must carry out a frequency hop in a very short time. The second user must hop from the carrier with the index 4 to the carrier with the index 3. The first user must hop from the carrier with the index 1 to the carrier with the index 3. The fourth user must hop from the carrier with the index 0 to the carrier with the index 3. The synchronization units are therefore allocated in their temporal order of appearance to the users according to the ascending order of the frequency gradients between the last communication carrier and the synchronization carrier. In the example shown in FIG. 8, a first synchronization unit $ITS_3$ is allocated to the third user, then a second synchronization unit $ITS_2$ is allocated to the second user, then a third synchronization unit ITS is allocated to the first user, then a fourth synchronization unit $ITS_4$ is allocated to the fourth user. The example shown in FIG. 8 is limited to the case of 4 users, but 7 users can synchronize themselves with the frame as explained above with reference to FIG. 7.

In a general manner, the criterion for allocating synchronization units is established in the following manner. For each user, the frequency variation slope between the last carrier used for communication and the synchronization carrier is calculated in hertz per second. In other words, the ratio between the frequency variation between the two carriers and the time interval between the last communication unit used and the first synchronization unit of the block of generic units reserved for this purpose is calculated. The first synchronization unit is then allocated to the user presenting the lowest ratio. The process is reiterated for the second synchronization unit of the block, then for the following units until all connected users which have to be synchronized during a superframe of duration $\Delta T$ are provided with an allocated synchronization unit.

If a plurality of blocks of synchronization units are reserved on a plurality of carriers during the first step described in FIG. 7, each synchronization unit of a block of a carrier is then allocated, then the process is reiterated for the following carrier and so on.

The examples described above with reference to FIGS. 5, 6, 7 and 8 are given by way of illustration for the clear understanding of the invention. The method of allocating shared resources according to the invention is not limited to the examples given and in particular to the quoted numerical values. In particular, a block of generic time-frequency units can comprise any number other than 6 units. In one alternative embodiment of the invention, it is also possible to reserve more than one block of generic time-frequency units at the end of each carrier if the synchronization requirements are greater or if the variations in the network load reveal a greater magnitude. In a different alternative embodiment of the invention, the block(s) of generic time-frequency units can also be chosen at a different temporal location of the frame rather than at the carrier end.

Figure 9:
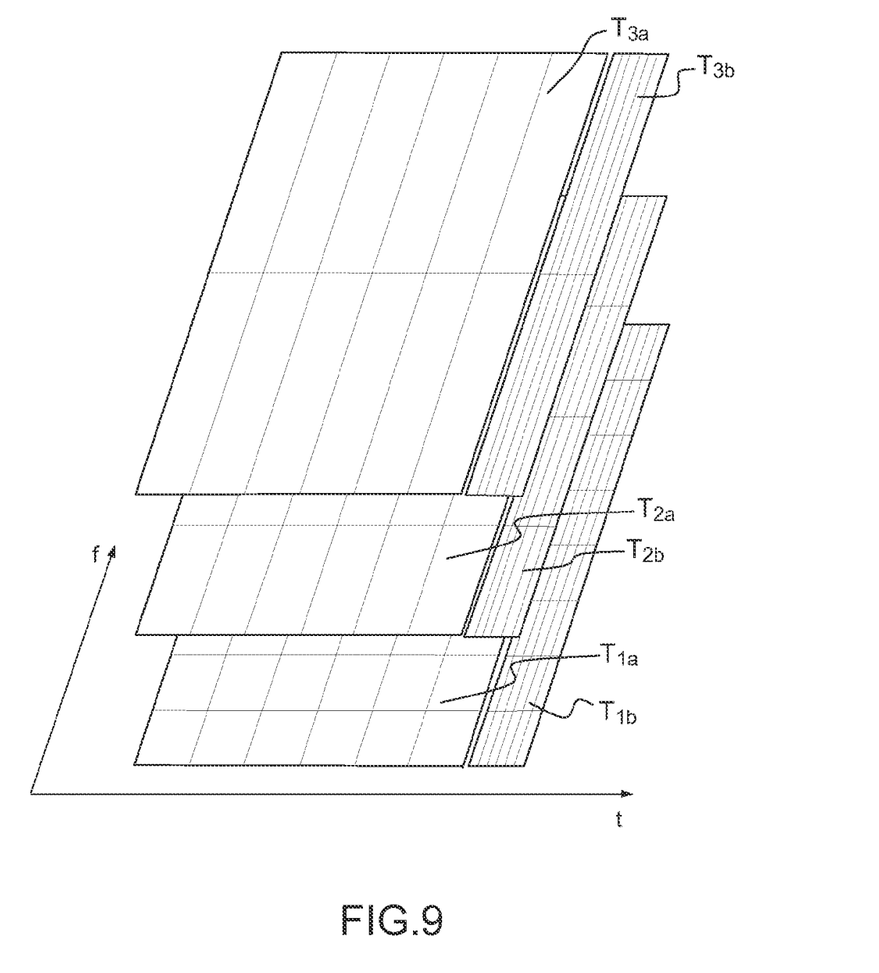
FIG. 9 shows an illustration of a second embodiment of the invention, in which the generic time intervals are generated in a second frame distinct from the first frame allocated specifically to communication.

FIG. 9 shows an example of arrangements of frames according to one particular embodiment of the invention.

In the examples described above, a frame is considered to be made up, on the one hand, of time-frequency units reserved for communication and, on the other hand, of blocks of reserved generic units at the end of each carrier.

FIG. 9 shows, for the same example as in FIG. 2, a different arrangement which consists in separating the communication units into a first frame T1$a$, T2$a$, T3$a$ and the generic units into a second frame T1$b$, T2$b$, T3$b$. The second frame is positioned temporally after the first frame.

One advantage of using two distinct frames is that a smaller volume of signalling data is required in order to transmit the time and frequency characteristics of the frames to the users. This advantage is now described in detail in the particular case of the DVB-RCS2 standard. As previously explained, this standard defines the signalling tables for communicating to users the structure of the frames in the time-frequency plan (table FCT2) and the precise allocation of the time-frequency units in a frame (table TBTP2).

Figure 10:
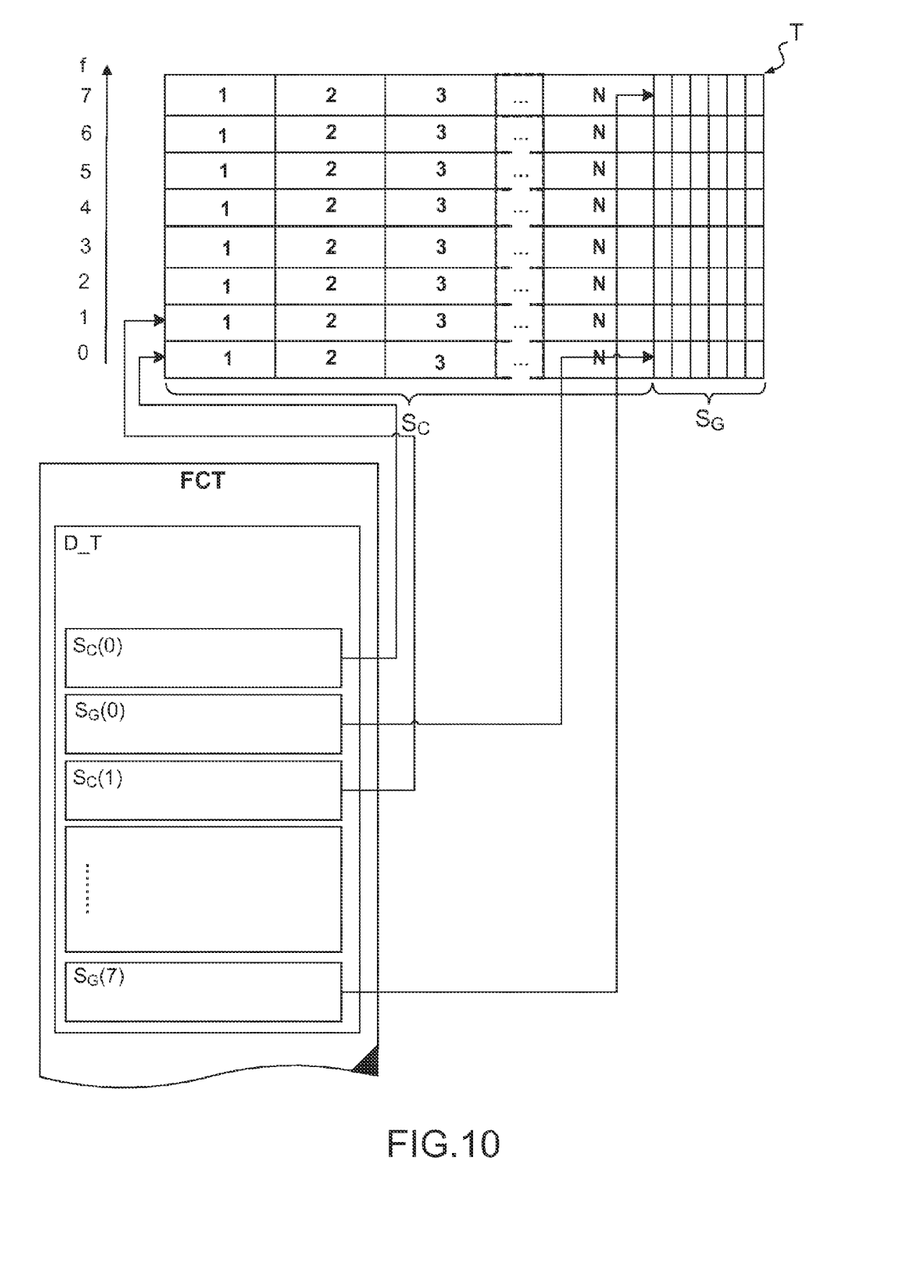
FIG. 10 shows a diagram illustrating the structure of a table signalling the composition of a frame designed according to the first embodiment of the invention.

FIG. 10 illustrates the structure of a signalling table FCT2 defining the composition of a frame T designed according to the first embodiment of the invention, i.e. the embodiment of the invention for which a single frame is designed, combining, on the one hand, the time-frequency units allocated to communication and, at the end of each carrier, a block of generic units. The section of the frame combining the units allocated to communication on each carrier is denoted $S_C$. The section of the frame combining the generic units is denoted $S_G$. In the example shown in FIG. 10, the frame T comprises 8 carriers indexed from 0 to 7.

The signalling table FCT2 therefore comprises the definition D_T of a single frame T. This definition consists notably in identifying the type associated with each time-frequency unit in the frame. In the example shown in FIG. 10, two types are possible, either the "communication" type or the "generic" type. The definition of the frame T is carried out by passing along the time-frequency plan according to the time axis then according to the frequency axis. In other words, the definition of the units is carried out for each carrier successively. Thus, the table FCT2 comprises, for each carrier, a first section $S_C(i)$ defining the N first time units (or the N first time intervals made up of a plurality of base units) as communication units, then a second section $S_G(i)$ defining the K last time units of the carrier as generic units (in the example K=6). These two sections $S_C(i)$, $S_G(i)$ are repeated for each carrier, producing a number of sections in the table FCT2 equal to 2 times the number of carriers of the frame.

Figure 11:
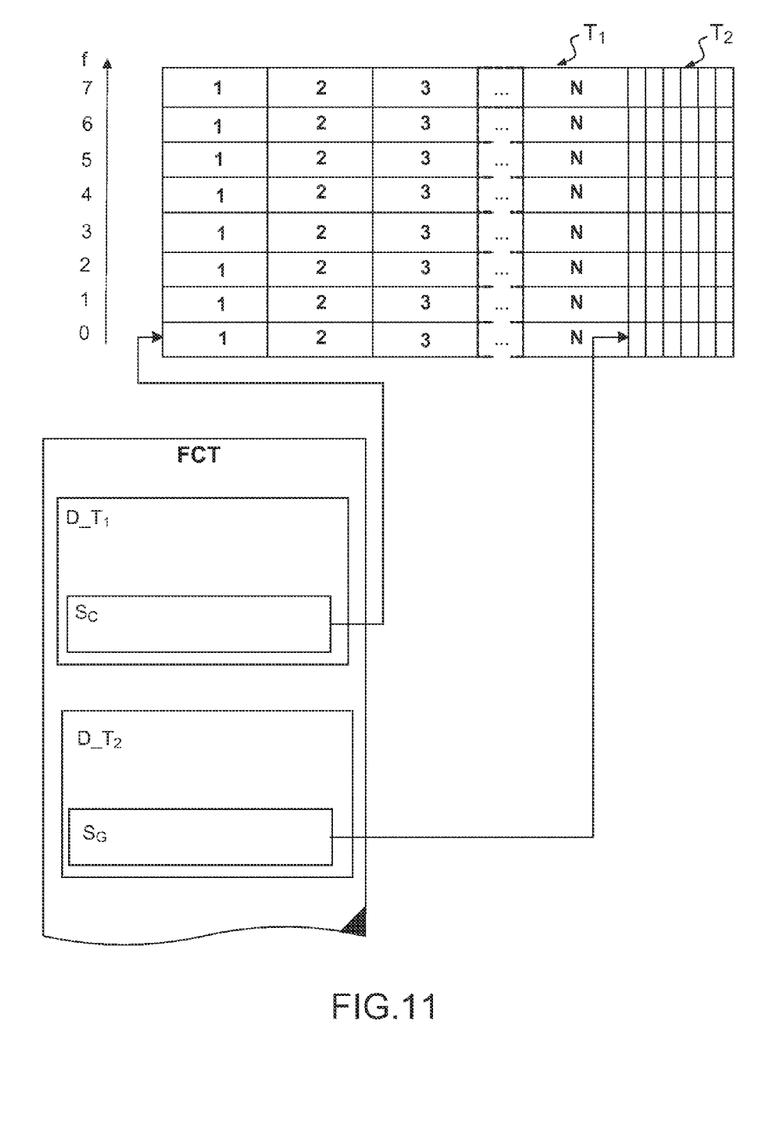
FIG. 11 shows a diagram illustrating the structure of the tables signalling the composition of two frames designed according to the second embodiment of the invention.

FIG. 11 shows, for the same scenario as in FIG. 10, an arrangement of the time-frequency plan according to two separate frames $T_1$, $T_2$ and the corresponding signalling table FCT2. The latter contains two definitions D_T1, D_T2 of the two associated frames. This time, since each frame comprises only one single type of unit (either a communication unit or a generic unit), it is necessary to define only one single section $S_C$ or $S_G$ each time by indicating that the same type is applied to all of the units of the frame. Thus, the signalling table FCT2 comprises a smaller volume of data for an arrangement with two frames compared with the arrangement with a single frame.

In a similar manner, the allocation tables TBTP2, transmitted at the frequency of an allocation, will also be reduced in volume in the case of the arrangement with two frames. This advantage is of particular interest for limiting the speed of the communication link which is used to transmit signalling data and thus increase the speed allocated to communications.

The invention claimed is:

1. A computer-implemented method of dynamic allocation of shared resources in a communication network including a plurality of receivers, the computer-implemented method being executed by a resource allocation device, the method comprising:
    defining, at a resource allocation device, in a time-frequency plan, a superframe of a given duration $\Delta T$ and a given spectral width $\Delta f$, including at least one frame,
    defining, at the resource allocation device, a regular time-frequency grid, of which one square, referred to as a time-frequency unit, constitutes the smallest time and frequency interval allocatable to a user at the at least one receiver of said communication network within said frame, and
    reserving, at the resource allocation device, on each carrier frequency of a frame, at least one block of a number K, greater than or equal to 1, of time-frequency units which can be dynamically allocated to a user for communication or for synchronization,
    wherein the number of time-frequency units per frame allocated for synchronization is at least equal to the minimum number $N_u$ of time-frequency units per frame required to provide the synchronization of all connected users, this minimum number $N_u$ being equal to the rounded value of the ratio of the duration of a superframe to the synchronization period of the user, multiplied by the number of users connected to the communication network, and
    transmitting, by the resource allocation device, to at least a receiver an information regarding the allocation of at least one time-frequency unit for communication and at least one time-frequency unit for synchronization to the receiver.

2. The dynamic allocation method according to claim 1, in which a number $N_B$ of blocks of K time-frequency units is reserved in a frame for the synchronization of users, this number $N_B$ being equal to the whole part in excess of the ratio between said minimum number $N_u$ of time-frequency units per frame required to provide the synchronization of all connected users and the number K of time-frequency units per block, the other blocks of K time-frequency units being reserved for the communication of users.

3. The dynamic allocation method according to claim 2, in which the blocks of K time-frequency units reserved for the synchronization of users are distributed in a regular manner among all of the carrier frequencies of a frame.

4. The dynamic allocation method according to claim 2, in which, in the blocks of K time-frequency units reserved for the synchronization of users, a number $N_u$ of time-frequency units is allocated to synchronization via access reserved for a user, said number $N_u$ being equal to the minimum number of time-frequency units per frame necessary to provide the synchronization of all connected users, the remaining time-frequency units within said blocks being allocated to the synchronization of users via random access or to the communication of users.

5. The dynamic allocation method according to claim 1, in which said blocks reserved for the synchronization of users are positioned at the carrier end.

6. The dynamic allocation method according to claim 1, in which a block of K time-frequency units reserved for the communication of users is combined to form a communication unit.

7. The dynamic allocation method according to claim 1, in which a superframe is made up of the concatenation of at least one first frame composed entirely of time-frequency units allocated to the communication of users, and a second frame composed of said blocks of K time-frequency units reserved on each carrier frequency in order to be dynamically allocated to a user for communication or for synchronization.

8. The dynamic allocation method according to claim 1, in which the configuration of the allocation of the time-frequency units of each frame of a superframe to communication or to synchronization is transmitted to the users periodically, with a period equal to the duration of a superframe.

9. The dynamic allocation method according to claim 1, in which the number K of time-frequency units per block is equal to 6 and can be broken down into 6 units allocated to the synchronization of users or 3 units allocated to the synchronization of users and 3 units, combined, allocated to the communication of users or to 6 units, combined, allocated to the communication of users.

10. The dynamic allocation method according to claim 1, in which said method is compatible with the DVB-RCS2 standard.

11. A computer-implemented method of dynamic allocation of shared resources in a communication network including a plurality of receivers, the computer-implemented method being executed by a resource allocation device at a satellite station associated with a return link between the plurality of receivers and the satellite station, the computer-implemented method comprising:
defining, at a resource allocation device of the satellite station, in a time-frequency plan, a superframe of a given duration $\Delta T$ and a given spectral width $\Delta f$, including at least one frame,
defining, at the resource allocation device of the satellite station, a regular time-frequency grid, of which one square, referred to as a time-frequency unit, constitutes the smallest time and frequency interval allocatable to a user at the at least one receiver of said communication network within said frame,
reserving, at the resource allocation device of the satellite station, on each carrier frequency of a frame, at least one block of a number K, greater than or equal to 1, of time-frequency units which can be dynamically allocated to a user for communication or for synchronization,
allocating, at the resource allocation device of the satellite station, to a user, a time-frequency unit reserved for synchronization within a block of a carrier frequency, said allocating including:
calculating, for each user connected to said communication network, the ratio between the frequency variation between the carrier frequency of said block and the last carrier frequency on which the user has communicated and the time interval between the last time-frequency unit used by the user for communication and the time-frequency unit reserved for synchronization to be allocated, and
allocating said time-frequency unit reserved for synchronization is allocated to the user for whom said ratio is the lowest, and
transmitting, by the resource allocation device from the satellite station, to at least a receiver an information regarding the allocation of at least one time-frequency unit for communication and at least one time-frequency unit for synchronization to the receiver.

12. A resource allocation device for dynamic allocation of shared resources for communication and synchronization of a plurality of user terminals in a communication network, the resource allocation device being configured to:
define, at the resource allocation device, in a time-frequency plan, a superframe of a given duration $\Delta T$ and a given spectral width $\Delta f$, including at least one frame,
define, at the resource allocation device, a regular time-frequency grid, of which one square, referred to as a time-frequency unit, constitutes the smallest time and frequency interval allocatable to a user at the at least one receiver of said communication network within said frame, and
reserve, at the resource allocation device, on each carrier frequency of a frame, at least one block of a number K, greater than or equal to 1, of time-frequency units which can be dynamically allocated to a user for communication or for synchronization,
wherein the number of time-frequency units per frame allocated for synchronization is at least equal to the minimum number $N_u$ of time-frequency units per frame required to provide the synchronization of all connected users, this minimum number $N_u$ being equal to the rounded value of the ratio of the duration of a superframe to the synchronization period of the user, multiplied by the number of users connected to the communication network, and
transmit, by the resource allocation device, to at least a receiver an information regarding the allocation of at least one time-frequency unit for communication and at least one time-frequency unit for synchronization to the receiver.

13. The resource allocation device for the dynamic allocation of shared resources according to claim 12, in which said allocated resources are those of the return channel between said user terminals and said resource allocation device.

14. A satellite communication management device comprising means to communicate with a plurality of user terminals via a satellite link according to a direct channel and a return channel, and a device for the dynamic allocation of shared resources on the return channel according to claim 13.

15. A resource allocation device for dynamic allocation of shared resources for communication and synchronization of a plurality of user terminals in a communication network, the resource allocation device being configured to:
define, at the resource allocation device, in a time-frequency plan, a superframe of a given duration $\Delta T$ and a given spectral width $\Delta f$, including at least one frame,
define, at the resource allocation device, a regular time-frequency grid, of which one square, referred to as a time-frequency unit, constitutes the smallest time and frequency interval allocatable to a user at the at least one receiver of said communication network within said frame, and
reserve, at the resource allocation device, on each carrier frequency of a frame, at least one block of a number K, greater than or equal to 1, of time-frequency units which can be dynamically allocated to a user for communication or for synchronization, allocate, at the resource allocation device, to a user, a time-frequency unit reserved for synchronization within a block of a carrier frequency including:
  a calculation, at the resource allocation device, for each user connected to said communication network, the ratio between the frequency variation between the carrier frequency of said block and the last carrier frequency on which the user has communicated and the time interval between the last time-frequency unit used by the user for communication and the time-frequency unit reserved for synchronization to be allocated,
  an allocation, at the resource allocation device, said time-frequency unit reserved for synchronization is allocated to the user for whom said ratio is the lowest, and
transmit, from the resource allocation device, to at least a receiver an information regarding the allocation to the receiver of at least one time-frequency unit for communication and at least one time-frequency unit for synchronization.

* * * * *